(12) United States Patent
Kargupta

(10) Patent No.: US 8,478,514 B2
(45) Date of Patent: *Jul. 2, 2013

(54) ONBOARD VEHICLE DATA MINING, SOCIAL NETWORKING, ADVERTISEMENT

(75) Inventor: Hillol Kargupta, Ellicott City, MD (US)

(73) Assignee: AGNIK, LLC, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/173,408

(22) Filed: Jun. 30, 2011

(65) Prior Publication Data

US 2011/0258044 A1    Oct. 20, 2011

Related U.S. Application Data

(63) Continuation of application No. 11/116,889, filed on Apr. 28, 2005, now Pat. No. 7,715,961.

(60) Provisional application No. 61/360,577, filed on Jul. 1, 2010, provisional application No. 60/565,840, filed on Apr. 28, 2004.

(51) Int. Cl.
*G06F 17/10* (2006.01)

(52) U.S. Cl.
USPC ....... 701/300; 701/1; 701/2; 701/3; 701/29.4; 701/31.5; 340/331; 340/531; 340/439; 340/905; 340/961; 707/999.01; 707/999.104; 180/65.21; 180/167; 180/168; 180/169; 318/587; 901/1

(58) Field of Classification Search
USPC ............... 701/1, 2, 3, 29.4, 31.5, 32.9, 33.4, 701/50, 300, 24, 25, 32.5, 33.6, 33.9, 114, 701/117, 118; 340/331, 531, 439, 905, 961, 340/989, 995.1, 991; 707/999.01, 999.104; 177/136, 139, 141; 709/203; 903/903; 180/65.21, 167, 168, 169; 303/152; 307/10.1; 318/587; 901/1
See application file for complete search history.

(56) References Cited

U.S. PATENT DOCUMENTS

| | | | |
|---|---|---|---|
| 4,839,835 A * | 6/1989 | Hagenbuch | 702/174 |
| 6,768,994 B1 * | 7/2004 | Howard et al. | 1/1 |
| 7,715,961 B1 * | 5/2010 | Kargupta | 701/29.3 |
| 2002/0059075 A1 * | 5/2002 | Schick et al. | 705/1 |
| 2007/0094268 A1 * | 4/2007 | Tabe | 707/10 |

\* cited by examiner

*Primary Examiner* — McDieunel Marc
(74) *Attorney, Agent, or Firm* — AGNIK, LLC

(57) ABSTRACT

An improvement of methods and systems using mobile and distributed data stream mining algorithms for mining continuously generated data from different components of a vehicle. The system is designed for both on-board and remote mining and management of the data in order to (1) detect the effect of various engine parameters on fuel consumption behavior, (2) predictive classification of driving patterns and associative indexing of driver performance matrix, (3) resource-constrained anomaly detection for onboard health monitoring, (4) vehicle-to-vehicle social networking and distributed data mining, (5) adaptive placement of advertisements based on vehicle performance profile and (6) onboard emissions analytics computation for wireless emissions monitoring and smog test.

20 Claims, 14 Drawing Sheets

The MineFleet Onboard Data Mining Platform MF-DMP101 and MF-DMP201

Figure 1. The MineFleet Onboard Data Mining Platform MF-DMP101 and MF-DMP201
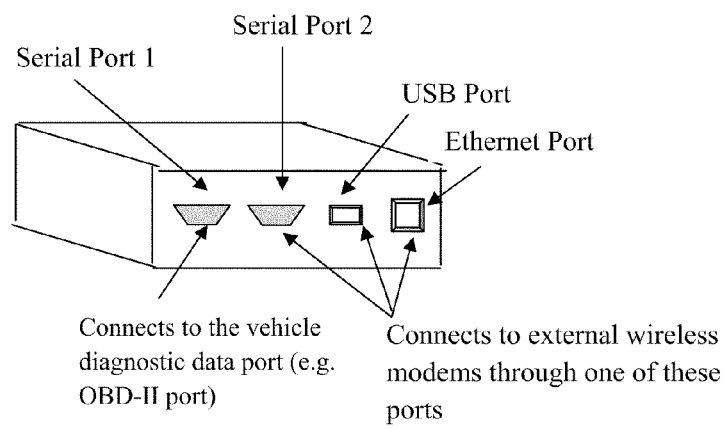

Figure 2. Third Party Network Gateway Devices hosting the MineFleet Onboard software.
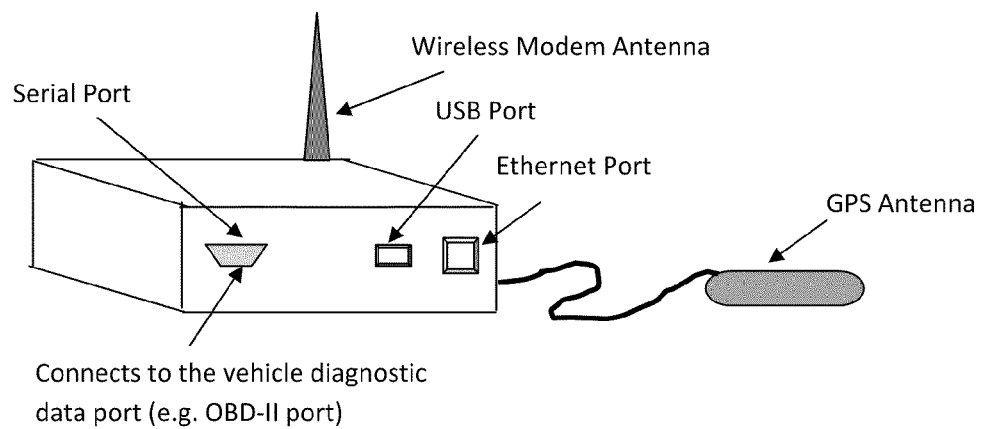

Figure 3. Handheld cell-phones hosting the network gateway program and/or the MineFleet Onboard software.
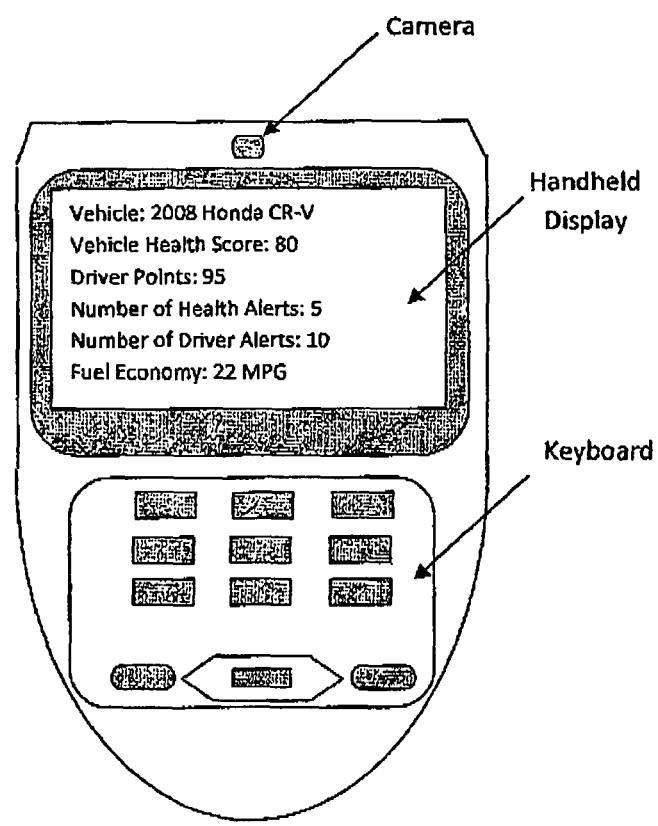

Figure 4. The Bluetooth-enabled OBD-II adapter.
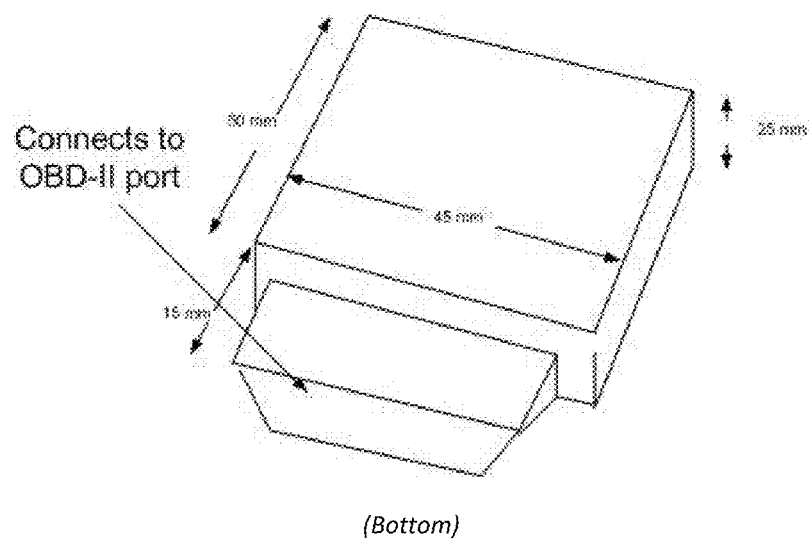

Figure 5. MINEFLEET Architecture Diagram
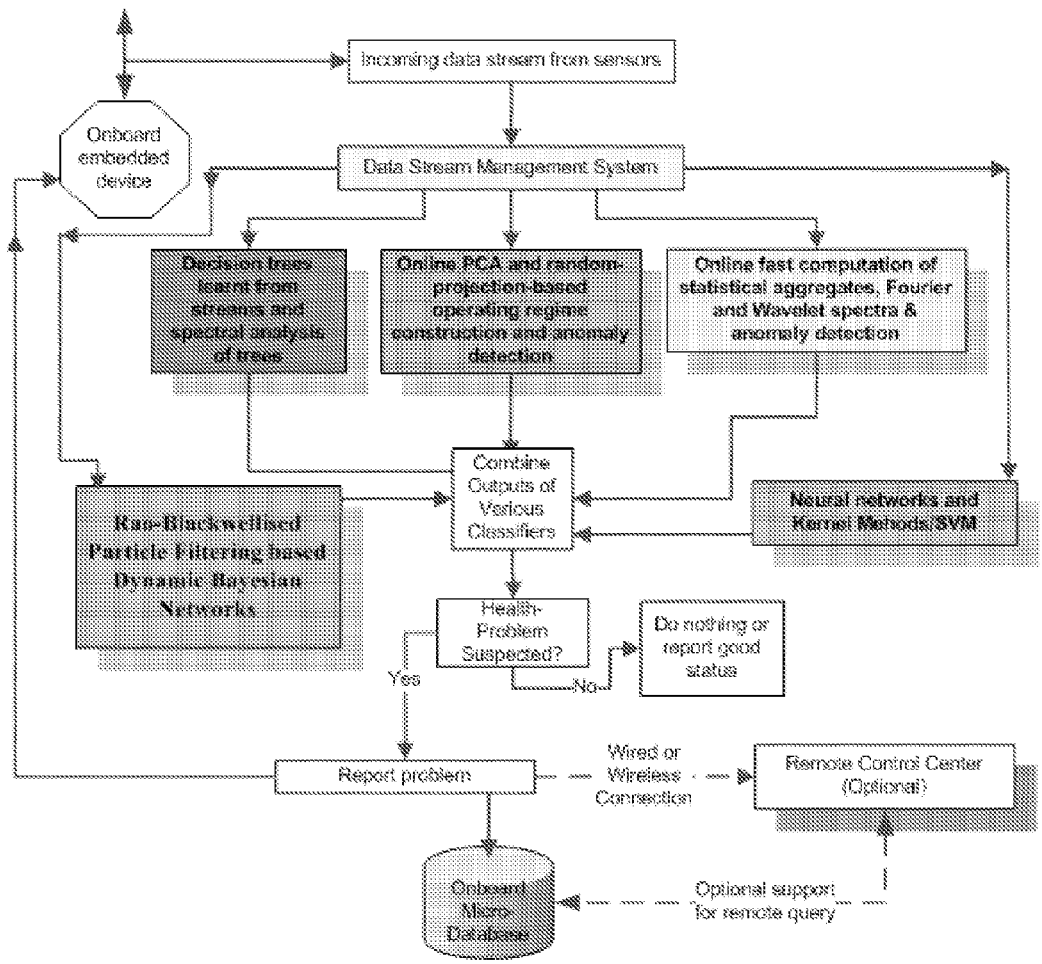

Figure 6. A summary panel showing the different vehicle health tests performed.

| MineFleet – Baltimore Transporter | |
|---|---|
| Vehicles Analytics<br>Diagnostic Trouble Codes<br>Fuel Economy<br>Vehicle Health Tests<br>  Vehicle Diagnostic Test<br>  O2 Lean Vehicles<br>  O2 Rich Vehicles | Vehicle Diagnostic Tests |
| | Combustion Temperature Inequality Monitor |
| | Combustion Temperature Control Decay Monitor |
| | Oxygen Sensor Operating Condition Monitor |
| Driver Analytics<br>  Driver Clustering<br>  Driving Performance<br>  Driver Avg. Analysis | Select All     Flagged Vehicles     Deselect All |
| Fleet Details<br>Name BWI Transport<br>Vehicles 6<br>Drivers 10 | Failed Diagnostic Test            Name |
| | Long Term Fuel Related Combustion Efficiency    Truck 2 |
| | Long Term Fuel Related Combustion Efficiency    Truck 4 |
| | Air Intake Volume Inconsistency    Truck 6 |

Figure 7. Detailed information about the failure of a particular health test.

| Analytic Visualization Browser – Van 37 | |
|---|---|
| Cumulative Vehicle Data Analysis<br>Diagnostic Trouble Codes<br>Fuel Economy<br>Vehicle Health Tests<br>  Summary<br>  Vehicle Health Tests<br>  History | Long Term Fuel Related Combustion Efficiency |
| | Test Description:<br>As part of the combustion formula, fuel delivery is also the most adaptive process the vehicle has to long term wear during normal engine operation. While there is system failure codes associated with reaching the limitations of its adaptability, often significant collateral breakdown has occurred before the actual code will set. This test is designed to monitor changes well before they reach the breakdown stage. By monitoring these changes within the fuel delivery portion as they occur over time, we can often preempt the collateral damage through early detection of the deterioration. |
| Benchmark Analysis<br>Compare with Benchmark | |
| | Long Term Fuel Trim Out of Range |
| Shift Analysis<br>Fuel Economy<br>Vehicle Health Tests<br>  Summary<br>  Thermal event detection<br>  Air intake volume inconsistency<br>  Long term fuel related combustion efficiency | Test Failed |
| | Recommendation:<br>MineFleet recommends checking fuel pressure (too high), injectors for leakage, leaking fuel pressure regulator, clogged evaporative emissions system, oxygen sensor contamination and clogged air filter as most likely causes when fuel trim falls figh. MineFleet recommends checking for clogged injector(s), ignition system components, fuel pressure (low), or water intrusion on oxygen sensors as possible causes. |

Figure 8. Fuel consumption analysis summary panel.
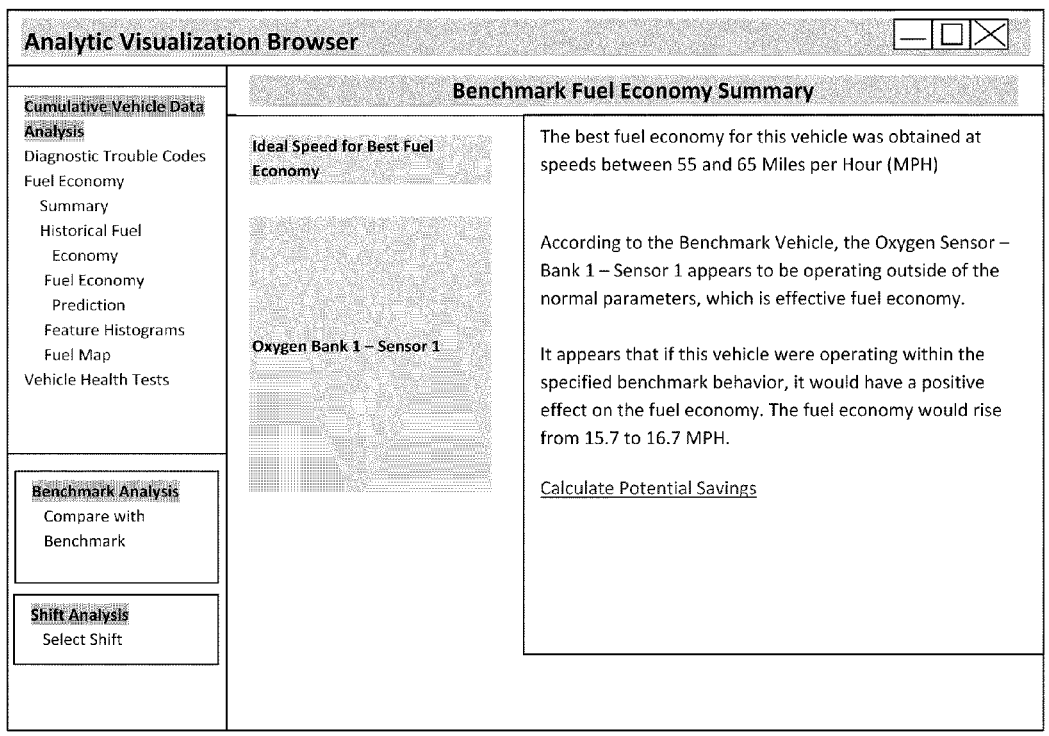

Figure 9. Fuel system performance optimization using predictive models.
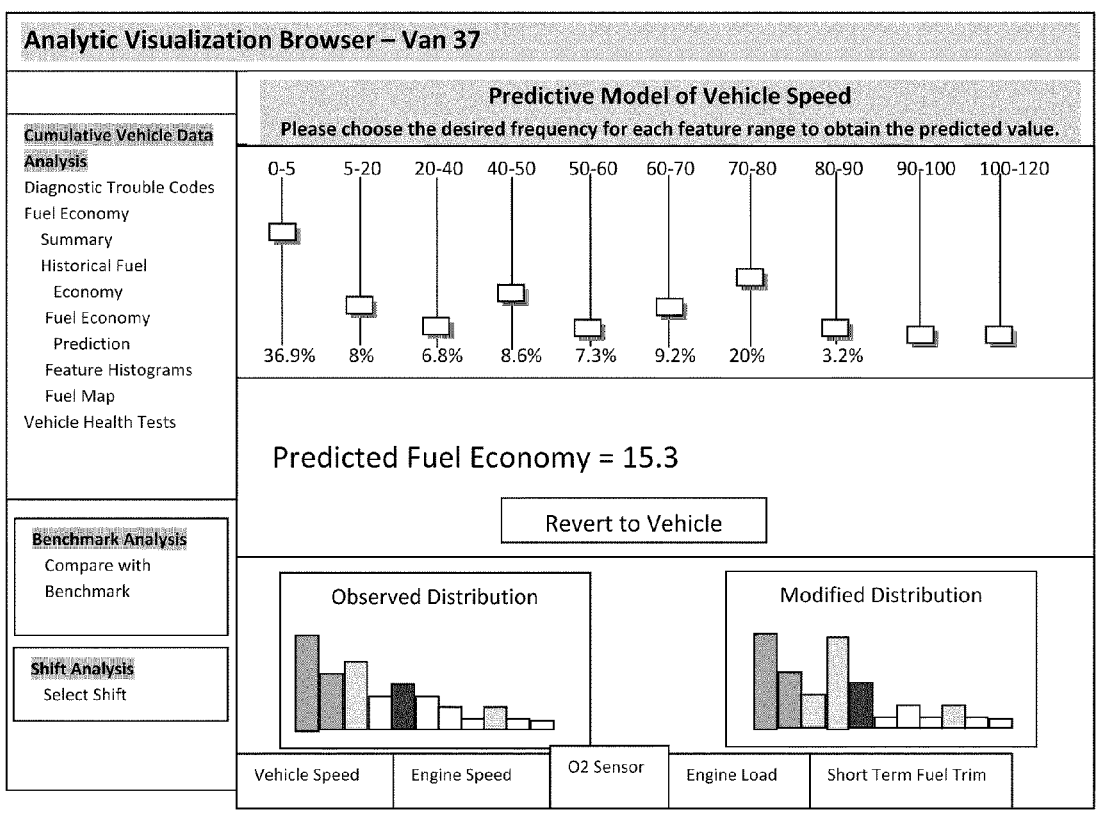

Figure 10. Emissions analytics interface.
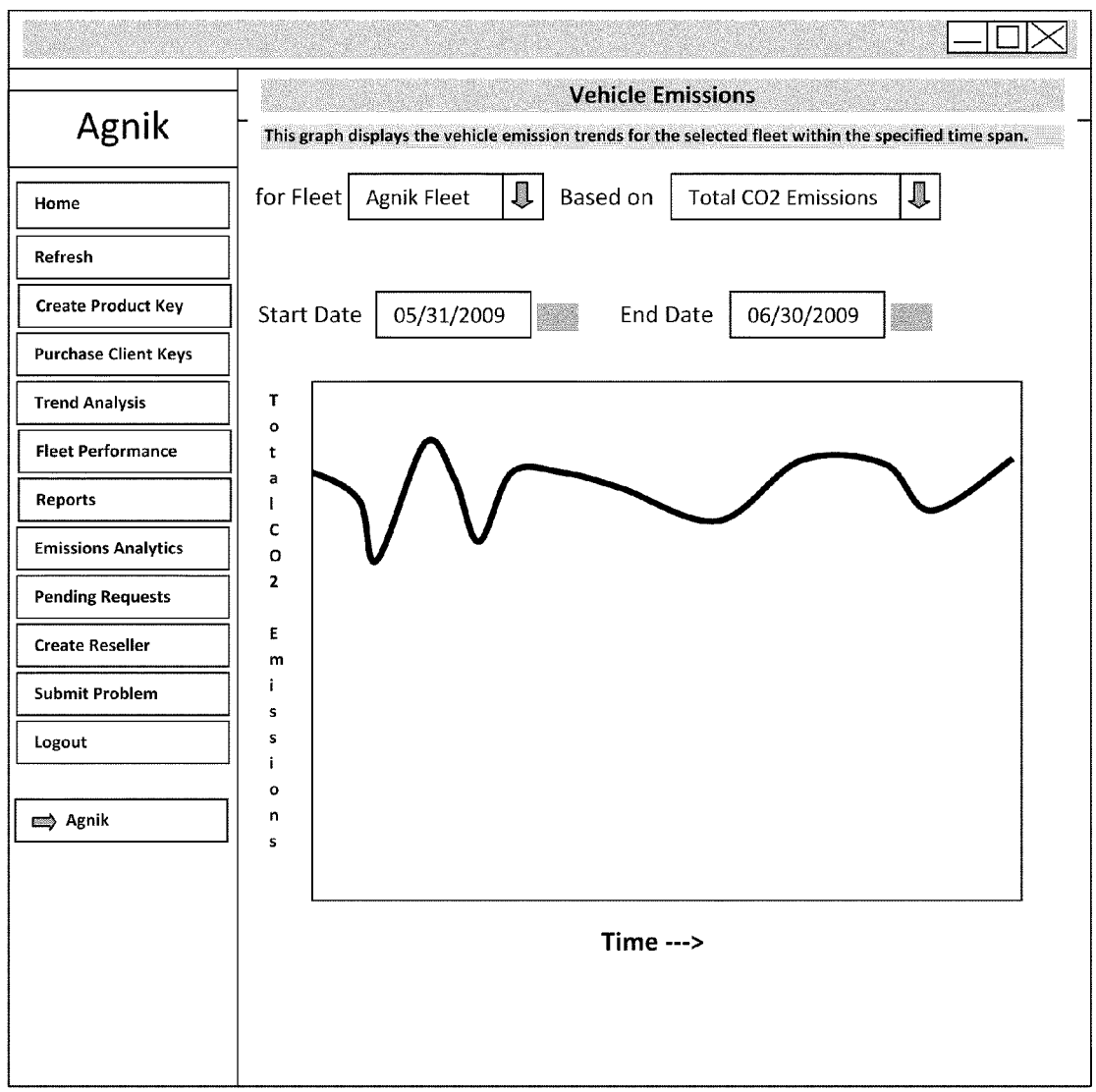

Figure 11. The vehicle health score visualization interface in MineFleet.
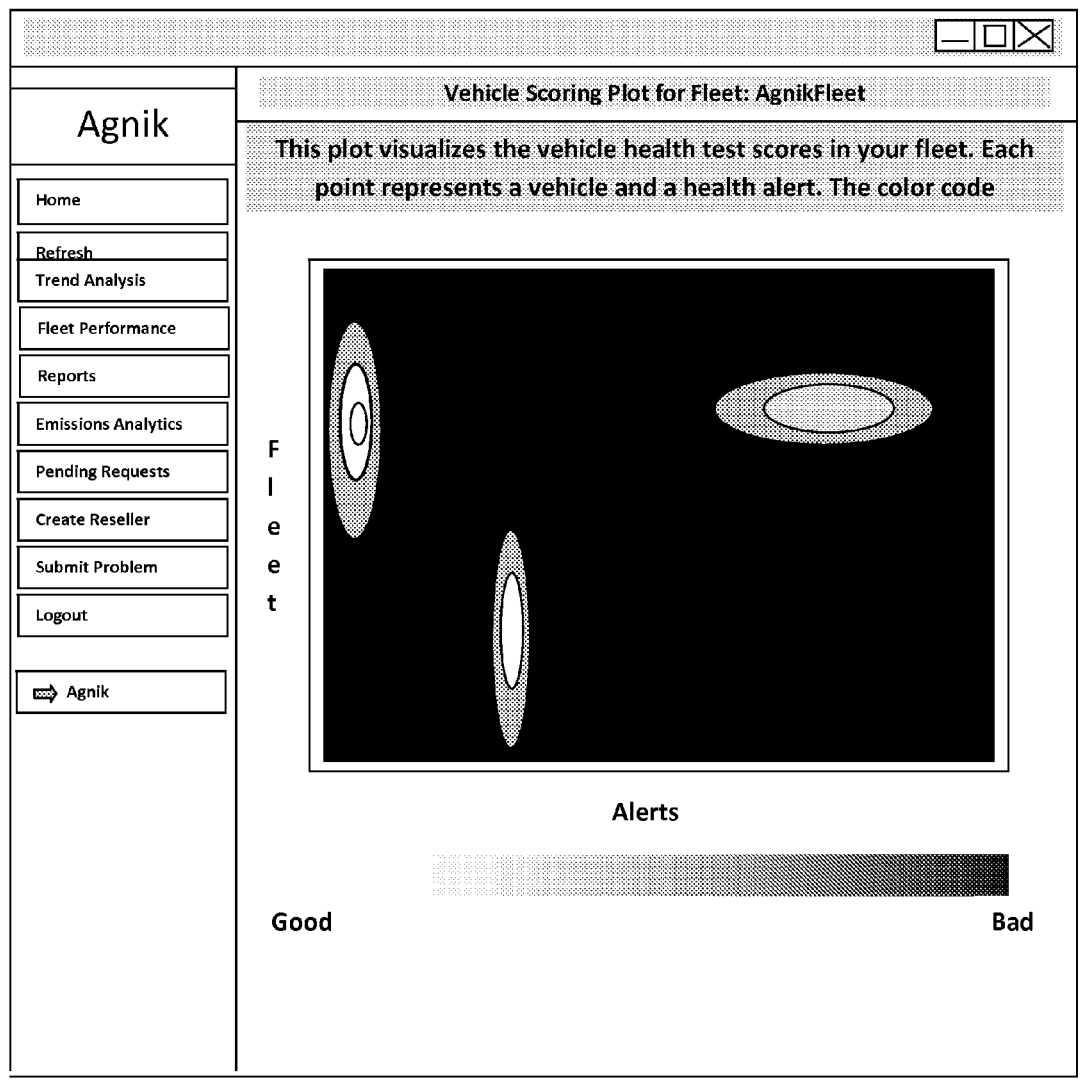

Figure 12. Predictive vehicle maintenance data analysis module linking maintenance and diagnostic data
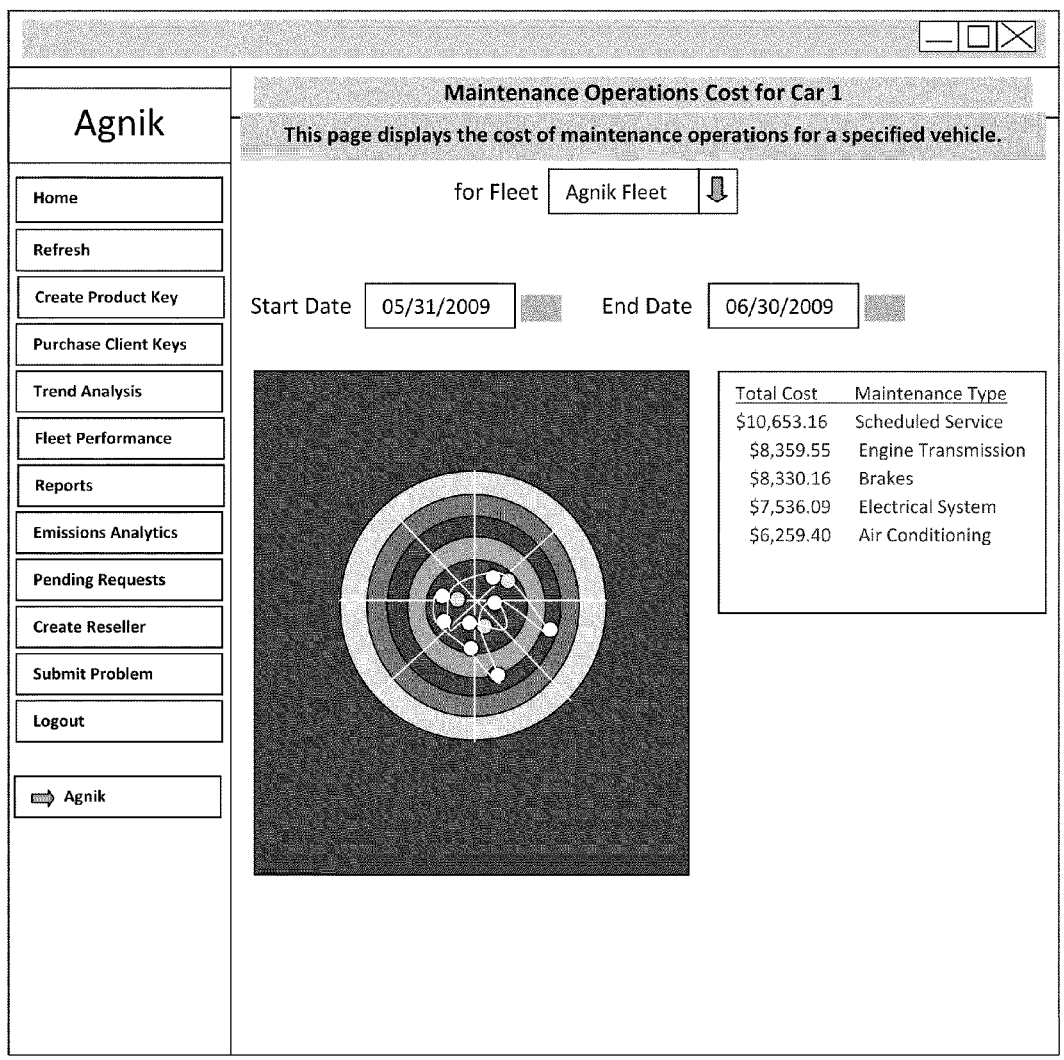

Figure 13. Vehicle and Accelerometer Frames of Reference.
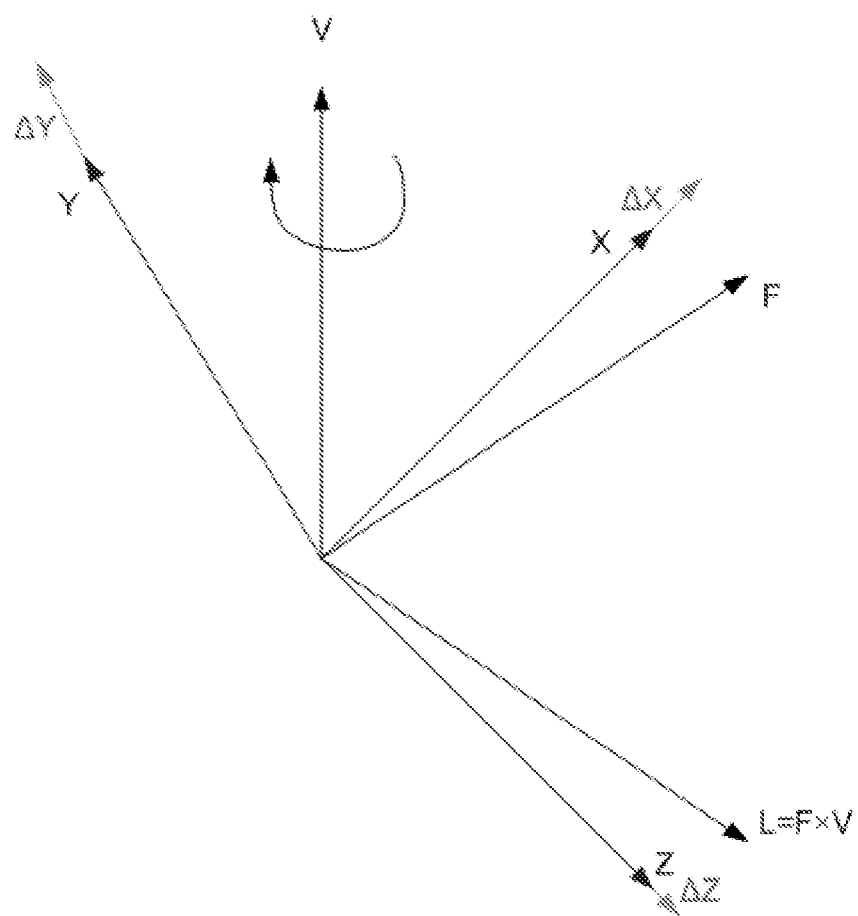

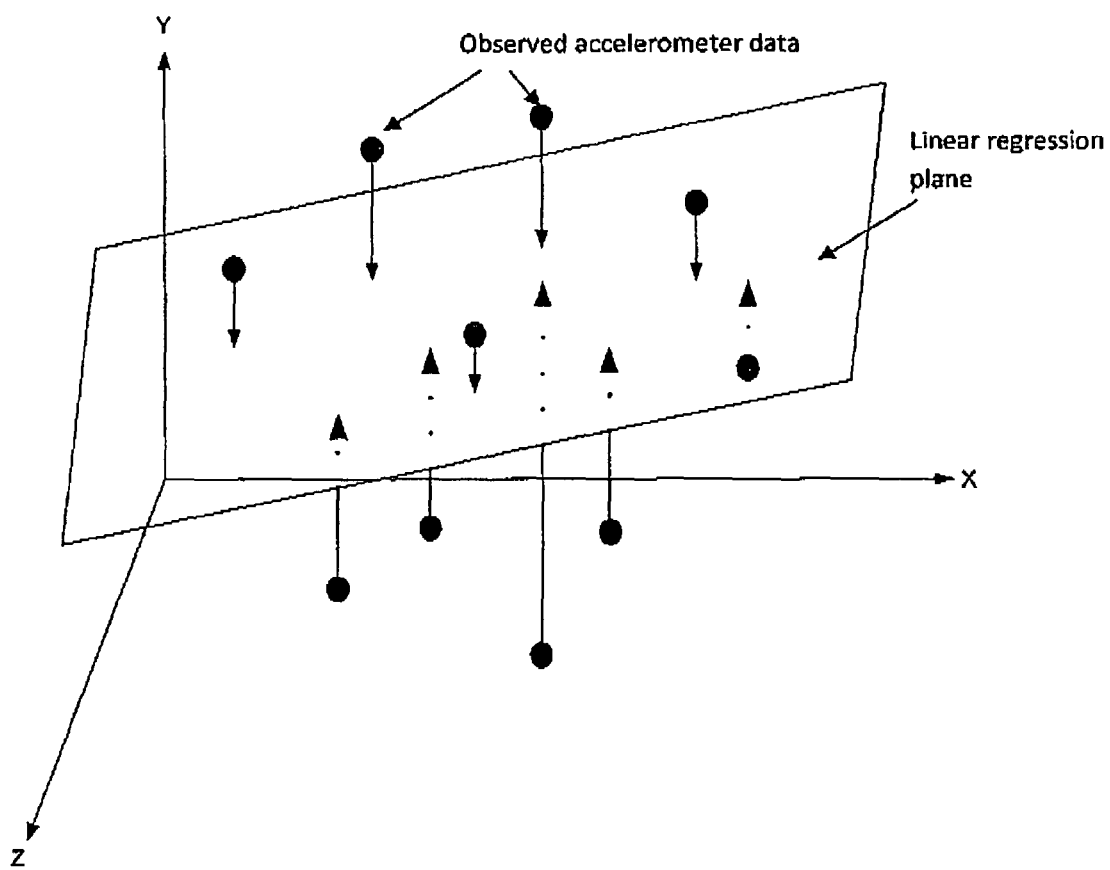
Figure 14. Multiple Linear Regression F-V Plane.

ONBOARD VEHICLE DATA MINING, SOCIAL NETWORKING, ADVERTISEMENT

RELATED APPLICATIONS

This application claims the benefit of U.S. Provisional Application No. 61/360,577, filed Jul. 1, 2010 and U.S. Non-provisional application Ser. No. 11/116,889, filed Apr. 28,2005 which are hereby incorporated by reference in its entirety.

FIELD OF INVENTION

The present invention relates generally to onboard and remote data stream mining of data collected from the vehicle data bus like OBD-II/CAN, J1708/J1939, accelerometer, GPS, and other related external sensor systems. This is an improvement of the currently available technology for vehicle onboard data mining and transmission of the resulting analytics to the server over wired or wireless networks. The data stream mining capabilities deal with advancement of the technology for generating predictive data mining models, outlier detection, predictive classification of driving patterns, associative indexing of driver performance matrix, vehicle-to-vehicle social networking, adaptive placement of advertisement based on vehicle performance and vehicle emission data analysis. The overall methodology relies upon onboard analysis of the data, sending the results of the analysis to the remote server or to other onboard devices over wired or wireless networks, and further aggregation and analysis of the analytics at the server or at the other onboard devices.

BACKGROUND OF INVENTION

Monitoring vehicle diagnostic data available from ports like OBD-II/CAN, J1708/J1939, accelerometer, and GPS data over the wireless network is a known art. Current art can be divided into two groups:
1. Methodology 1:
   a. Collecting the vehicle diagnostic data onboard the vehicle,
   b. sending the data to a server computer over the wireless network, and
   c. analyzing the data at the server for determining the health condition of the vehicle, computing fuel economy, monitoring emissions and driver behavior,
   d. presenting the results of the analysis to the user via a web link to the server.
2. Methodology 2:
   a. Collecting the vehicle diagnostic data onboard the vehicle from the onboard diagnostics port and accelerometer,
   b. Analyzing the data onboard the vehicle for determining the health condition of the vehicle, computing fuel economy, monitoring emissions and driver behavior,
   c. throwing away the collected data,
   d. sending the results generated by the onboard analysis to the remote server over the wireless network.
   e. presenting the results of the analysis to the user via a web link to the server.

Note that the main difference between these two approaches is where the data analysis is performed. The location of the data analysis has a huge impact on the technology used since real-time onboard monitoring of vehicle performance data using resource constrained computing environment requires completely different sets of algorithms and business models (note that onboard analysis dramatically reduces the data communication cost).

Several examples of known art based on Methodology 1 exist. For instance, U.S. Pat. No. 5,499,182 is directed to multiple vehicle component sensors mounted to a host vehicle measure vehicle component parameters indicative of a host vehicle's driver performance. A microprocessor module detachably coupled to the vehicle mounting unit affixed to and uniquely designated for a given host vehicle poles each vehicle sensor of that host vehicle to read, process, and store the vehicle operation data generated thereby. A playback mounting unit at a remote computer connects the remote computer to the host vehicle's microprocessor module in order to establish digital communication whereby the vehicle operation data and the analysis results processed therein are retrieved and displayed for a user. In addition, the driver integrity-checking module is based on some pre-determined values of the parameters and is done remotely after the data is played back on the remote computer. Also, the vehicle needs to be mounted by a multiple number of sensors as opposed to using the standard OBDII data bus for getting the vehicle data in the subject vehicle driver performance system.

U.S. Pat. No. 5,207,095 is directed to an onboard vehicle computer system for use in evaluating an operator's braking technique that employs a plurality of vehicle-mounted sensors. The onboard computer in that system periodically receives and stores the parametric values associated with vehicle braking sensed by the sensors. The data thus generated by that computer is then available to be read later by an instructor who compares the recorded parametric values to formulate further instructive steps. That system does not perform any lightweight and sophisticated onboard data mining techniques on the data. Any evaluations to be made in light of the raw data are left for the user to make by themselves. Furthermore, as the vehicle sensor monitoring system there is intended specifically as an instructional tool, monitoring is performed only during those discrete time intervals related to an instructional session.

U.S. Pat. No. 6,609,051 is directed to a vehicle condition-monitoring system that employs machine learning and data mining technologies on data acquired from a plurality of vehicles in order to create models. Frequent acquisition of vehicle sensor and diagnostic data enables comparison with the created models to provide continuing analysis of the vehicle for repair, maintenance and diagnostics. The on-board diagnostic systems process sensor readings and diagnostic information of the vehicle Embedded Control System in order to detect defaults. The maintenance systems on-board the vehicle continuously process sensor readings to determine the condition of the vehicle systems, parts and lubricants (e.g., brake pad wear, battery quality, and oil quality). Off-board diagnostic systems acquire vehicle diagnostics and sensor data or control on-board diagnostics and testing functions. The system uses OEM proprietary or standardized interfaces, for example, OBD to connect to the vehicle. Physical connections link the vehicle and the workshop test equipment, with short-range wireless communication systems eventually replacing cable connections.

U.S. Pat. No. 6,330,499 directs itself to a vehicle diagnostic and health monitoring system that includes a client computer device within the vehicle, coupled to the vehicle's monitoring systems, for data management, remote session management and user interaction, a communication system, coupled to the client computer device, for providing remote communication of data including data derived from internal monitoring systems of the vehicle, and a remote service center including a vehicle data store, a server computer, a diagnostic engine, and a communicator for communicating the results of analysis of vehicle information to the client computer device via the communication system.

U.S. Pat. No. 5,034,894 directs itself to a self-diagnosis computer system onboard a motor vehicle wherein a plurality of detectors are mounted on that vehicle's engine to detect any aberrant operating conditions. Although the computer system there performs continual monitoring while the vehicle is in operation, no provision is made for the assessment of driver performance based on any sensed parameters.

Similarly, U.S. Pat. No. 5,074,144 is directed to an onboard vehicle computer system for monitoring vehicle performance. Various transducers for continually monitoring various vehicle parameters are employed in that system; however, comprehensive means for analyzing the measured vehicle parameters to characterize or assess driver performance, per se, are not provided.

Prior state-of-the-art is based on linear threshold-based techniques that belong to Methodology 1 allow relatively simple tasks such as detection of a feature value crossing a limit set a priori. Moreover as noted earlier, these techniques are applied after the data is uploaded to a remote desktop computer from the vehicle. For example, these techniques may check whether the driver crossed a specified speed limit. Unfortunately, these techniques are not capable of detecting linear and nonlinear complex driving patterns and they require an expensive process of transferring data to a remote monitoring station at a regular basis over the wireless network.

However, prior art, U.S. Pat. No. 7,715,961, is an exception that belongs to Methodology 2 and performs advanced statistical data analysis and modeling for detecting patterns from vehicle performance, driver behavior, fuel consumption and emissions data onboard the vehicle and sending the resulting analytics to the server over the wireless network. The current patent application is an improvement of the art reported in U.S. Pat. No. 7,715,961. The current work reports more advanced onboard vehicle data stream mining techniques and their applications in different business processes. The main differences are as follows:

1. Advanced data stream mining algorithms such as principal component analysis, clustering, anomaly detection, predictive modeling, classification using support vector machines, decision trees for analysis of the vehicle performance data onboard the vehicle.
2. Application of the onboard vehicle performance data mining technology for advanced fuel consumption modeling, emissions monitoring and smog test, driver behavior scoring, vehicle health scoring.
3. Application of the onboard vehicle performance data mining technology in a distributed environment comprised of multiple vehicles connected over wireless networks for insurance premium computation, vehicle-to-vehicle social networking, playing computer games, and adaptive placement of advertisement based on vehicle performance profile.

OTHER REFERENCES

1. H. Kargupta, K. Sarkar, M. Gilligan, "MineFleet: An Overview of a Widely Adopted Distributed Vehicle Performance Data Mining System", Accepted for Industrial full presentation in 2010 ACM SIGKDD Conference on Knowledge Discovery and Data Mining, Washington D.C.
2. H. Kargupta, V. Puttagunta, M. Klein, and K. Sarkar, "On-Board Vehicle Data Stream Monitoring Using MineFleet and Fast Resource Constrained Monitoring of Correlation Matrices", Published in the Special Issue on Learning from Data Streams, New Generation Computing, Vol 25 No. 1, 2007.
3. H. Kargupta, R. Bhargava, K. Liu, M. Powers, P. Blair, M. Klein, University of Maryland Baltimore County and K. Sarkar, W. D. Handy, Agnik, LLC, "Vehicle Data Stream Mining (VEDAS): A Mobile and Distributed Data Stream Mining System for Real-Time Vehicle Monitoring", Proceedings of SIAM Data Mining Conference, 2004.

SUMMARY OF THE INVENTION

The Environmental Protection Agency (EPA) requires vehicle manufacturers to install on-board diagnostics (OBD) system for emission control in light-duty automobiles and trucks. It requires that various vehicle system parameters are made available through a standard data port. A large number of both EPA-required and additional manufacturer-introduced parameters can be observed using this port. Most modern automobiles come with the OBD-II system, a second generation OBD system, which offers access to a large collection of vehicle parameters. Similar data ports are also available in heavy-duty vehicles that follow different standards like J1708 and J1939. Usually these data ports generate high throughput data streams and data stream mining algorithms can be effectively used for various types predictive modeling, clustering, outlier detection, and classification of the vehicle data patterns. Moreover, a fleet comprised of multiple vehicles creates a large, mobile, and distributed environment where each vehicle, a moving source of data streams, is connected in the network using limited bandwidth wireless network. Therefore, sending the vehicle data from all the vehicles over the wireless network is difficult because of the limited communication-bandwidth and scalability of the overall system.

The invention features a multi-agent, distributed data stream mining system for onboard mining of vehicle data observed through the OBD-II, J1708/J1939, and other similar ports and external sensors. The patterns and statistical models generated by the onboard module are sent over the wireless or wired devices to a remote computing node for additional mining of the models and storage in databases or data warehouses. This approach advances the current technology by a large factor since onboard data stream mining using distributed data mining technology obviates the need for sending raw data to the remote server for analysis.

Instead the different computing devices residing inside the vehicles perform on-board data stream mining and sends the data mining models and analytics to the remote control center. This invention specifically deals with the following items:

1. Onboard Data Stream Mining for Detecting the Effect of Various Engine Parameters on fuel Consumption.
2. Onboard Predictive Classification of Driving Patterns and Associative Indexing of Driver Performance Matrix.
3. Resource-constrained Anomaly Detection for Onboard Vehicle Health Monitoring.
4. Onboard Vehicle Emissions Data Analysis.
5. Automated adaptive algorithm generation and management.
6. Web-based Presentation of the Results of Onboard Data Analysis and User-Interaction.
7. Onboard and remote-server-based techniques for advertising products and services that are triggered by the patterns identified by the vehicle data analysis.
8. Onboard and remote-server-based techniques for playing single and multi-party games based on the vehicle data.

The on-board module is equipped with data stream management and mining algorithms that run on an embedded devices, PDA or similar light-weight computing devices connected to the vehicle data bus. This onboard system includes a data stream management system and modules for real-time advanced analysis of the continuous data streams. Analytics are generated on a continuous basis and sent over wireless networks to the server either immediately or based on a schedule. The control center module runs on a desktop computer located at a remote control station and it will support management and mining of downloaded data from the onboard system. The onboard module is able to support two-way communication with the coordinator agent running at the control station at the remote server managing the vehicle(s) remotely. In addition, the application allows the control station to mine, monitor, and query the performance of a single or collection of vehicles. The control station also communicates with a web server. The web server offers a browser-based application for viewing the analytics. The control station and the web server offers targeted advertisements triggered by the patterns detected by analyzing the vehicle related data analyzed onboard the vehicle and at the server. The sever and the web server also allows single and multi-party games based on the vehicle performance patterns.

BRIEF DESCRIPTION OF DRAWINGS

FIG. 1. The MineFleet Onboard Data Mining Platform MF-DMP101 and MF-DMP201.

FIG. 2. Third Party Network Gateway Devices hosting the MineFleet Onboard software.

FIG. 3. Handheld cell-phones hosting the network gateway program and/or the MineFleet Onboard software.

FIG. 4. The Bluetooth-enabled OBD-II adapter.

FIG. 5. MINEFLEET Architecture.

FIG. 6. A summary panel showing the different vehicle health tests performed.

FIG. 7. Detailed information about the failure of a particular health test.

FIG. 8. Fuel consumption analysis summary panel.

FIG. 9. Fuel system performance optimization using predictive models.

FIG. 10. Emissions analytics interface.

FIG. 11. The vehicle health score visualization interface in MineFleet.

FIG. 12. Predictive vehicle maintenance data analysis module linking maintenance data with diagnostic data.

FIG. 13. Vehicle and Accelerometer Frames of Reference.

FIG. 14. Multiple Linear Regression F-V Plane.

DETAILED DESCRIPTION OF THE PREFERRED EMBODIMENTS

The present invention is a method and system using mobile and distributed data stream mining algorithms for mining continuously generated data from different components of a vehicle. The system is designed for both onboard or remote mining and management of the data in order to characterize the typical and unusual vehicle health, driving, and fleet behavior. The system uses resource-constrained lightweight data stream management, onboard stream mining, and distributed data mining techniques.

The main components of the MineFleet system are as follows:
1. Meta-level algorithms for activating and tuning of algorithms based on vehicle and fleet performance.
2. Various algorithms to analyze the performance of the vehicle based on the data observed through the vehicle data bus and other sensors:
   a. Principal component analysis-based fast incremental algorithms for monitoring the multi-variate operating regimes of the vehicle system being monitored.
   b. Rao-Blackwellised Particle Filtering (RBPF) based Dynamic Bayesian Networks for streams.
   c. Incremental support vector machines and kernel methods.
   d. Ensemble-based approach for combining the output of any subset of these algorithms in a sound decision-theoretic manner.
   e. Onboard predictive and monitoring algorithms for emission data analysis and correlating the emission characteristics with vehicle and driver behavior parameters.
3. Web-based Presentation of the Results of Onboard Data Analysis and User-Interaction.
4. Onboard and remote-server-based techniques for advertising products and services that are triggered by the patterns identified by the vehicle data analysis.
5. Onboard and remote-server-based techniques for playing single and multi-party games based on the vehicle data.

3.1 Architecture of MineFleet

The architecture of the MineFleet system is designed to support predictive data stream mining for detecting the health of onboard systems and meta-level management of algorithms for optimal performance of the system itself. The architecture of MineFleet (FIG. 3) is based on the following main components:
1. Onboard Module:
   a. Sensors for collecting data.
   b. Onboard Data Stream Management System (DSMS) for efficient continuous access to data.
   c. An onboard embedded system that supports the following tasks:
      i. Onboard analysis of the data stream and subsequent transmission of the diagnostic reports to a remote server over wired or wireless network.
      ii. Meta-level dynamic selection and management of the algorithms for monitoring the vehicle.
      iii. Onboard module for adaptive targeted advertising based on the results of the analysis of the vehicle data.
2. Communication Management Module: This module will manage the transfer of data/analytics from the onboard platform to the remote desktop machine. The MineFleet system will minimize the wireless data communication by performing the data analytics onboard the vehicle and schedule and/or priority/demand-based transmission of the analytics to the server.
3. Remote Control-Center Module:
   a. Long-term scalable data analytic stream management system.
   b. Support for long-term aggregate statistical analysis, predictive modeling, and anomaly detection across the entire fleet or subset of vehicles in a fleet.
   c. Alert management module.
   d. Report generation module for generating vehicle, driver, and fleet reports
4. Remote Web-Server Module:
   a. A web-server module for accessing the results of the data analysis, alerts, and diagnostic reports remotely over secure networks.

b. A web-server module for advertising products and services that are triggered by the patterns identified by the vehicle data analysis.

c. Module for playing single and multi-party games based on the vehicle data.

MineFleet is equipped with a mobile data stream management system (DSMS) for supporting all the data analysis and monitoring tasks. MineFleet deploys a collection of data analysis techniques. These data analysis techniques run on top of the data stream management system for efficient execution of the underlying operations. The data analysis techniques are managed by the MineFleet meta-level algorithm management system which selects and manages algorithms based on the current status of the vehicle, driver, and the fleet.

3.2 Automated Algorithm Management

MineFleet Algorithm Generation and Management Engine is in charge of selecting and managing the algorithms that runs both onboard the vehicle and at the server. The Mine-Fleet makes use of the vehicle-performance characteristics and information from the entire fleet to select which set of algorithms should be used at a given time. MineFleet activates a set of onboard and server-side data analysis algorithms by identifying those which are appropriate for the current status of the vehicle and the fleet. The algorithms are selected from a library of various domain knowledge-based tests and also data mining techniques for predictive modeling and anomaly detection. The methodology can be summarized as follows:

1) Evaluate the performance and the health-condition of the vehicle.
2) Compare/benchmark the behavior of the vehicle with respect to other similar vehicles in the fleet.
3) Generate a prescription and a schedule for the appropriate algorithms based on the available monitoring algorithms which uses the following kind of tests:
   a. Science-based domain knowledge-intensive tests.
   b. Data driven predictive modeling/anomaly detection techniques.

MineFleet uses several vehicle health, driver behavior, fuel-consumption and emission related data analysis algorithms. These algorithms are described in the following sections.

3.3 Vehicle Health Tests and Fleet-Level Trend Detection

MineFleet is equipped with a collection of science-based vehicle health tests. These tests are used for evaluating the status of a vehicle. The tests are performed onboard the vehicle. If a test fails then an alert is generated. Moreover, the MineFleet server provides statistics about the different test failures in different vehicles of the entire fleet. If a particular test fails frequently in the fleet then we may need to perform several related tests in order to further investigate the problem. Events like this are triggered by the MineFleet. FIG. 5 shows MineFleet panels for presenting the vehicle diagnostic test results. We discuss two such health tests in the following for illustrating the approach.

1) Air Intake Volume Inconsistency Detection Test: Air and Fuel are the primary chemical components of the combustion process. In order to maintain proper burn efficiency, the ECM uses this signal to add the correct proportionate amount of fuel to the chamber for the reaction to occur. By monitoring this signal, we can ascertain if there is negative impact to the formula and thereby causing combustion (and fuel) inefficiencies, or worse, engine damage.

2) Engine Intake Vacuum Inefficiency Detection: Vacuum is created through normal engine operation; the intake stroke of each piston draws in the fuel/air mixture to be consumed. A decline in engine vacuum may be a result of a minor leak or potential mechanical breakdown. The ECM's response to changes in vacuum is simply to alter fuel delivery. However, continued operation under these conditions can create violent mechanical failure due to a skewed air/fuel ratio, and subsequent fuel detonation.

3.4 Onboard Statistical Data Modeling

MineFleet is equipped with advanced multi-variate statistical and data stream mining algorithms for automated monitoring and anomaly detection. Usually no single technique works reliably in all scenarios. This may result in high number of false positives. Instead of relying upon one single technique, MineFleet makes use of an ensemble-based approach that uses various algorithms to detect health-problems and combine their outputs to produce the overall outcome of the system in a sound decision theoretic manner.

Typically, sensors in the vehicle subsystems generate two types of data. The observed operating-condition-variables which vary in an independent manner and the dependent features that change behavior in response to the changes in the operating-condition-variables. Examples of operating-condition-variables in conventional automobiles include the following: Barometric Pressure, Calculated Engine Load (%), Engine Coolant Temperature (° F.), Engine Speed (RPM), Engine Torque, Intake Air Temperature (IAT) (° F.), Mass Air Flow Sensor 1(MAF) (lbs/min), Start Up Engine Coolant Temp. (° F.), Start Up Intake Air Temperature (° F.), Throttle Position Sensor (%), Throttle Position Sensor (degree), Vehicle Speed (Miles/Hour), and Odometer (Miles).

On the other hand, an automobile system will also generate other features that depend upon the operating conditions. Examples from the fuel sub-system include Air Fuel Ratio, Fuel Level Sensor (%), Fuel System Status Bank 1 [Categ. Attrib.], Oxygen Sensor Bank 1 Sensor 1 [mV], Oxygen Sensor Bank 1 Sensor 2 (mV), Oxygen Sensor Bank 2 Sensor 1 (mV), Oxygen Sensor Bank 2 Sensor 2 (mV), Long Term Fuel Trim Bank 1(%), Short Term Fuel Trim Bank 1(%), Idle Air Control Motor Position, Injector Pulse Width #1 (msec), and Manifold Absolute Pressure (Hg), Diagnostic Trouble Codes.

Since operating conditions for a complex vehicle can be diverse, segmenting the distribution of values can be effective. Once the data is segmented into different regimes, models for each one of the regimes should be developed for the different regimes. Consider the linear model for Battery Voltage (BV[t]) generated as a function of Injector Pulse Width (IPW):

$$BV[t] = 0.1343 * IPW1[t-3] + 0.0814 * IPW1[t-2] + 0.0592 * IPW1[t-1] - 0.3832 * IPW1[t] + 0.2644 * BV[t-3] + 0.2645 * BV[t-2] + 0.2989 * BV[t-1] + 0.8794$$

The symbol t denotes timestamp whereas [t−i] represents the observation at time t−i. FIG. 4 shows the plot of the true data against the model output. Rest of this section describes the general technical approach for such data modeling and anomaly detection in MineFleet.

3.5 Benchmarking a Vehicle Sub-System

MineFleet supports benchmarking a vehicle or any of its particular sub-system with respect to another vehicle which in good shape. For example, we can use this technique to compare the behavior of a fuel subsystem of a bunch of 2000 International Truck with respect the behavior of the fuel sub-system of 2007 International Truck. In order to do that we can compare the performance metric of the subsystems from different vehicles and also compare the distribution properties based on the estimations constructed by predictive modeling techniques.

3.6 Stream Algorithms for Onboard Principal Component Analysis

Representation construction techniques are frequently used in data mining for defining a set of features that can easily identify the underlying patterns in the data. This usually involves projecting high-dimensional data to a low-dimensional space. Principal Component Analysis (PCA) is a popular technique to do so. This technique projects the data to a low dimensional feature space that preserves similarity among the data points. The MineFleet is equipped with online incremental PCA algorithms for light-weight data analysis on continuous data streams. These algorithms will be used for the following specific purpose:

1. Construct a low-dimensional embedding of the multivariate operating regimes of the monitored system. These regimes will capture the distribution of the sensor data and characterize the typical operating behavior.
2. Use the operating regimes for detecting the anomalous behavior.

PCA is a statistical technique for analyzing multivariate data [Hotelling, 1933]. It involves linear transformation of a collection of related variables into a set of principal components. All the principal components are statistically uncorrelated and individual principal components are ordered with respect to the statistical variance of that component. Consider the random vector $X=(X_1, X_2, \ldots, X_n)^1$ with mean $E[X]=0$ and covariance matrix $Cov[X]=E[X^T X]=\sigma_x$. The $i^{th}$ principal component of X is a linear combination $Y_i = X a_i^T$, where $a_i$ is a unit eigenvector of $\sigma_x$ corresponding to the $i^{th}$ largest eigenvalue $\lambda_i$. In this case, $Y_i$ is uncorrelated with the previous principal components $(Y_1, Y_2, \ldots Y_{i-1})$ and has maximum variance. In general, we are interested in representing X by means of a small set of principal components (dimensionality reduction). Let $Y'=[Y_1, \ldots, Y_k]$ be the first k principal components of X, where k<<n. These principal components can be used to obtain a reasonable approximation of the original data as follows: $X'=Y' A'^T$ where the columns of $A'$ consist of the first k eigenvectors of $\sigma_x$.

[1] We denote our vectors as row vectors.

Consider a data stream mining problem that observes a series of data blocks $(X_1, X_2, \ldots, X_s)$, where $X_t$ is an $m_t \times n$ dimensional matrix observed at time t (i.e., $m_t$ observations are made at time t). If the data has zero-mean, the sample covariance $Cov_t$ based on data blocks $X_1, X_2, \ldots, X_t$ can be computed in a recursive fashion as follows:

$$Cov_t = \frac{\sum_{j=1}^{t-1} m_j}{\sum_{j=1}^{t} m_j} \left[ Cov_{t-1} + \frac{m_t}{\sum_{j=1}^{t-1} m_j} \Sigma'_t \right]$$

where $\Sigma'_i = (X_i X_i)/m_i$ is the sample covariance matrix computed from only the data block $X_i$. This clearly shows that the covariance matrix can be incrementally maintained. At any given moment one can update the covariance matrix and compute the eigenvectors. However, in many applications this is an extremely expensive proposition and it may create a bottle-neck hindering scalable performance of the stream mining system.

Therefore, we need incremental PCA algorithms that will be able to update the eigenvectors and the eigenvalues of the covariance matrix with little computational cost, without explicitly performing the entire eigenanalysis for every new observation from the stream. The computer vision literature [Hall, et al, 1998] offers several algorithms to perform eigenanalysis in an incremental manner. These techniques work by computing the changes in the basis introduced by the new observation from the stream and then rotating the subspace by an appropriate amount. Matrix perturbation theory also offers tools to deal with the problem of computing principal components from stream data. If the change in the covariance matrix is small then we may not need to update the eigenvectors and the eigenvalues. This is very likely to happen when the observed data stream is not producing any novel characteristics. In that case, we can use the following inequalities for bounding the changes in the eigenvectors and eigenvalues due to the changes in the covariance matrix.

Let $E = Cov_t - Cov_{t-1}$. Let $\lambda'_1 \geq \lambda'_2 \geq \ldots \geq \lambda'_k$ be the dominant eigenvalues of the perturbed covariance matrix $Cov_t$; let $\gamma'_1 \geq \gamma'_2 \geq \ldots \geq \gamma'_k$ be the corresponding eigenvectors. Using matrix perturbation theory [Stewart, 1990] we can write, $\|\gamma_1 - \gamma'_1\| \leq (4\|E\|_F)/(\delta - 2^{1/2}\|E\|_F)$ and $|\lambda_1 - \lambda'_1| \leq 2^{1/2} \|E\|_F$, where $\delta$ is the difference between the $\lambda_1$ and $\lambda_2$ of the matrix $Cov_t$, sometimes called its eigengap. The Frobenius norm of a matrix E is defined as $\|E\|_F = (\Sigma_i \Sigma_j (E_{ij})^2)^{1/2}$. This research will also evaluate and implement the incremental PCA technique proposed by Hall et al. (1998).

The PCA technique is used for modeling and benchmarking of the vehicle subsystems and driver behavior.

3.7 Onboard Clustering Techniques for Identifying Distribution Regimes

A low dimensional similarity-preserving representation of the potentially high dimensional data stream is very important for scalable performance of a data stream mining system. The previous sections proposed incremental PCA technique to address that. Once the representation is constructed, we need to identify the different operational regimes of the stream in order to detect the normal characteristics and outliers. The proposed research will use 1) incremental clustering and 2) techniques from computational geometry to address these issues. This section explains the online clustering technique.

Clustering is an important unsupervised data mining technique frequently used for identifying similar objects, transactions, and behaviors of observed items from a given domain. Incremental clustering techniques can be used to identify the different regimes of the underlying distribution of the stream data. There exists little work [Guha, 2000] [O'Callaghan et al., 2002] on stream data clustering. They proposed an incremental k-Median clustering algorithm for stream data. They showed that it out-performs k-Means clustering algorithm. The proposed research will implement and evaluate this algorithm.

There also exist grid based clustering algorithms [Agrawal, 1998] [Han, 2001] that operate by dividing the data space into rectangular grids and then identifying those grids that contain dense regions of points. These grid based clustering algorithms can operate by performing only a small number of passes over the original data. We would like to extend a grid based clustering approach so that it can operate in a data stream environment by identifying those regions in the data space that represent typical operating regimes.

3.8. Detecting Anomalies

As mentioned earlier, MINEFLEET will make use of several anomaly detection techniques and combine their results for computing the likelihood of health-problem. Apart from the polygon-based anomaly detection algorithm described in the previous section, it will also deploy several other anomaly detection techniques. This section describes one of those based on the local outlier factor (LOF) approach [Breunig et al., 2000] that works by assigning outlier scores to the network traffic based on their anomalous nature.

The main idea of this method is to assign to each data example a degree of being outlier, which is called the local outlier factor (LOF). The outlier factor is local in the sense that only a restricted neighborhood of each object is considered. For each data example, the density of the neighborhood is first computed. The LOF of specific data example p represents the average of the ratios of the density of its nearest neighbors to the density of the example itself.

It is apparent that there is much larger number of examples in the cluster $C_1$ than in the cluster $C_2$, and that the density of the cluster $C_2$ is significantly higher that the density of the cluster $C_1$. Due to the low density of the cluster $C_1$ it is apparent that for examples q inside the cluster $C_1$, the distance between the example q and its nearest neighbor is generally greater than the distance between the example $p_2$ and its nearest neighbor which is from the cluster $C_2$, and therefore example $p_2$ will not be considered as outlier. Therefore, the simple Nearest Neighbor approach based on computing the distances fail in these scenarios. However, the example $p_1$ may be detected as an outlier using the distances to the nearest neighbor. On the other hand, LOF is able to capture both outliers $p_1$ and $p_2$ due to the fact that it considers the density around the points.

3.9. Time-Series Segmentation & Anomaly Detection Based on Fourier and Wavelet Analysis MineFleet makes use of several techniques for extracting features from the multi-variate time-series data. It involves time series segmentation, Fourier transformation, and Wavelet analysis of the data. Time-series data can be broken into a sequence of piecewise linear segments. For different segments the system is capable of computing Fourier/wavelet characteristics. Usually the number of linear segments turns out to be much smaller than the number of original data points. Therefore this representation of the time series allows for efficient computation and storage of the data. Several online and batch-wise algorithms exist for performing time series segmentation. Classifiers constructed based on the Fourier/Wavelet spectra and time-series segments are used for outlier detection.

3.10. Incremental Support Vector Machines and Kernel Methods for Classification

Linear classifiers for nonlinear classifications like the support vector machines (SVM) [Burgess, 1998] are attractive for on-board applications since linear techniques are fast. This research will also explore incremental SVM [Ralaivola et al., 2001] for on-board classification. Given a training set S, which consists of pairs $\{x_i, y_i\}_{i=1}^N$, where $x \in \Re^n$, and $y \in \{-1, 1\}$ a Support Vector Machine (SVM) tries to find a single hyperplane that separates the positive from the negative examples [Burgess, 1998]. Since there can be an infinite number of hyperplanes that satisfy this criterion, an additional constraint is imposed. That constraint says that the optimal hyperplane is the one which has the largest margin between positive and negative examples. Thus, if p is the shortest distance from the hyperplane to the nearest positive point, and q is the shortest distance from the hyperplane to the nearest negative point, we choose that hyperplane which has the maximum margin, which is defined as p+q. Those points which lie directly on the surface of the hyperplane are called support vectors because they can be thought of as the supports of the hyperplane.

In the simplest case, the hyperplane is a linear surface, and the solution to the problem is given by a straightforward quadratic optimization problem. However, in the case where the decision surface is nonlinear, a mapping function $\Phi$: $\Re^n \mapsto H$ is used, where H denotes another (possibly infinite dimensional) Hilbert space. In the formulation of the optimization problem, only inner products of the form <x,y> appear. Thus, it can be shown that under the mapping $\Phi$: $\Re^n \mapsto H$, only terms of the form $<\Phi(x), \Phi(y)>$ appear. In many cases, we do not need to know the mapping explicitly. We only need to know the inner product as it appears above. Thus, we can write a new function $K(x, y) = <\Phi(x), \Phi(y)>$ and only calculate these inner products.

In many cases, the function K is quite easy to compute. A typical value of K is given as: $K(x, y) = e^{-\|x-y\|^2/2\sigma^2}$. Notice that this kernel function maps n dimensional vectors to the set of real numbers. With the substitution of a positive definite kernel such as the one given, a very similar quadratic programming problem ensues. The interesting effect, however, is that the decision surface is linear in the space of $\Phi$ and can be extremely nonlinear in the original data space. Thus, we are able to obtain a highly nonlinear SVM with minimal additional computation compared to the linear case. Note that the linear case is simply the kernel function $K(x,y)=<x,y>$. Once the support vectors are calculated, it is possible to discard the entire data set S except for those support vectors, thus resulting in a significant reduction in total memory requirements. Given the modest computational complexity SVMs are an attractive family of algorithms for satellite systems.

The research proposed here will be to extend Support Vector Machines to the case where data arrives incrementally. Instead of performing a large batch operation, the SVM will be updated as new data arrives, thus allowing for the case where new classes or features arrive in the data. There has been some work done in this area, such as [Ralaivola, 2001]. However, we will need to further modify such algorithms to ensure that they operate within the constraints posed by onboard computation.

3.11. Bayesian Networks for Vehicle Data Streams

It is computationally intractable to develop deterministic models for highly complex systems such as FCS using deterministic models. Probabilistic approaches that model the behavior of a system based on its observed statistics are often preferred.

Bayesian networks (BN) provide a compact representation of the probability distribution of a system's states where the interdependencies are captured by its graphical structure and the magnitudes of the dependencies by local conditional probability tables (CPT) of each node/variable. MineFleet is equipped with BN learning algorithms to analyze vehicle data stream onboard the vehicle and at the server. It is powered by both static and dynamic BNs. Let Y denote the vector of random variables of the stream data, the system state can then be represented as vector $X=(X_1, X_2, \ldots, X_n)$ where $X \supset Y$, may also contain variables that are not observable (hidden). A static BN assumes that the probabilistic dependencies between these variables do not change with time. It can be used to model the system's normal behavior which is stable or changes only very slowly. Dynamic BN (DBN), on the other hand, includes not only the current state $X(t)$, but also one or more temporally preceding states, (e.g., $X(t-1), X(t-2), \ldots, X(t-k)$ for a kth order DBN). DBN is thus capable of modeling also the temporal dependencies. A well constructed BN can be a powerful tool for anomaly detection and other prognostic tasks. A few examples tasks are briefly listed below, some can be done using static BN, others require dynamic BN.

Anomaly detection. If we can assume that the states representing normal behavior of the system are more probable than the anomalous states, then an alert of a possible anomaly can be issued when the new data case $Y(t)$ from the input stream is determined according to the BN to have an exceptionally low probability, e.g., $Pr(Y(t))<c$ where c is a threshold.

Fault location/isolation. After a possible anomalous state is identified, a component or subsystem that may be responsible for the anomaly can be located based on whether its input-output patterns are consistent with normal (expected) behavior. For example, component i becomes suspicious if $Pr(Y_{i,output}(t)|Y_{i,input}(t))$ is very small, where $Y_{i,input}(t)$, $Y_{i,output}(t) \subset Y$ are observed input and output patterns of component i.

Anomaly forecasting. If dynamic BN is used, the likelihood of a known anomalous pattern Z to occur at a future time point, say t+j, can be measured by the probability $Pr(X(t+j)=Z|X(t), X(t-1), \ldots, X(t+1-k))$. Anomalous sub-patterns of X can be forecast similarly.

Hypothesis test. Hypothetical anomaly and fault patterns generated from other methods can be tested in a similar way.

3.12. Combining the Output of the Data Mining Modules

MineFleet takes an ensemble-based approach for combining the output of the different data mining techniques. Given a tuple, each technique generates its output along with a confidence factor. The outputs are combined weighed by the corresponding confidence factor.

3.13. Vehicle Emissions Data Analysis

MineFleet constructs multi-variate predictive models of the various components of the vehicle emissions such as $CO_2$, CO, HCx and NOx. It constructs the models onboard the vehicle and sends those to the remote server for storage and decision support. Various statistical data analysis techniques are used for such modeling of the emissions data. For example, MineFleet makes use of piece-wise polynomial regression models using various observed parameters including vehicle speed v, acceleration a, product of velocity and acceleration, v·a, product of velocity and jerk (derivative of acceleration), v·j, engine speed, $v_e$, engine acceleration (derivative of engine speed), $a_e$, mass air flow, $M_{af}$, catalytic converter temperature, $T_c$, and engine coolant temperature, $T_e$, Malfunction Indicator Lights, trouble code and various other parameters. These parameters are usually obtained through the vehicle onboard diagnostic data port. Multiple predictive models are generated for various operating regimes of the observed vehicle performance parameters. For example, different segments can be defined using the means and standard deviations of the engine speed parameter, $\mu_{v_e}$, $\sigma_{v_e}$. For example, four basic segments can be constructed as follows: "Very Low Engine Speed" ($v_e < \mu_{v_e} - 2\sigma_{v_e}$), "Low Engine Speed" ($\mu_{v_e} - \sigma_{v_e} \leq v_e < \mu_{v_e}$), "High Engine Speed" ($\mu_{v_e} \leq v_e < \mu_{v_e} + \sigma_{v_e}$). "Very High Engine Speed" ($\mu_{v_e} + \sigma_{v_e} \leq v_e < \mu_{v_e} + 2\sigma_{v_e}$), and "Extremely High Engine Speed" ($\mu_{v_e} + 2\sigma_{v_e} \leq v_e$). Predictive models for such different operating regimes are constructed. These models are sent to the server and used to generate the overall emissions profile of the vehicle.

The emissions profile of the vehicle along with its EPA SmartWay Greenhouse scores are presented on the MineFleet Webpage. The Web Server also allows automatic reporting of the emissions profile through emails and database queries launched by applications or users for wireless emissions monitoring programs and/or smog checks. Based on the emissions profile of the vehicle the user or the application may decide whether or not the vehicle would pass the smog test.

3.14. Onboard Computation of Vehicle Health Scores and MineFleet Fault Codes MineFleet makes use of techniques described in Sections 2 through 12 onboard the vehicle for detecting potential health problems in the vehicle. Overall health profile of the vehicle is used for assigning a health score. This information is also used for generating MineFleet Fault Codes. These codes can be used by mechanics for easy understanding of the vehicle health conditions. MineFleet fault codes are labels comprised of letters and numbers that can be associated with one or a set of health problems. Each MineFleet Fault Code usually comes with a brief description of what the code means. The vehicle scores and MineFleet Fault Codes are computed onboard the vehicle, sent to the server over the wireless network, presented to the user through stand-alone or web-based user interface. Time-critical events may also be sent to the user by email or SMS or other similar services. In the case the onboard device has a display or other mechanisms for user-interaction then such time-critical events can also be reported to the driver onboard the vehicle.

3.15 Fast Onboard Computation of Vehicle Fuel Consumption Analytics

This module computes predictive models for fuel consumption/economy and quantifies how different vehicle operating parameters changes the fuel consumption/economy. Fuel consumption/economy of a vehicle depends on various fuel sub-system parameters and operating condition parameters listed in Section 3.4. The current approach makes use of statistical data analysis algorithms and linear algebraic techniques like the ones reported in Sections 3.4, 3.6, and 3.11 in order to build a model of fuel consumption as a function of the fuel-subsystem and operating condition parameters. The models are allowed to converge based on the incoming observed vehicle performance and operating condition data. The model is computed in a functional form onboard the vehicle and reported to the server. In addition, correlation matrices and dominant eigenvectors of the covariance matrices are reported to the server over the wireless network. This approach identifies how different operating condition parameters change the fuel consumption and fuel economy by executing the following steps:

STEP 1: Using statistical regression and correlation analysis technique build a predictive model for fuel consumption/economy and other operating condition parameters.

STEP 2: Collect data onboard the vehicle and let the models converge until a given accuracy requirement is satisfied.

STEP 3: Use the converged model coefficients to identify the effect of the corresponding operating condition parameters on fuel consumption and fuel economy.

Fast computation of fuel consumption/economy model onboard the vehicle for determining the fuel economy or consumption over a given period of time requires special purpose algorithms since it must be done in a resource-constrained environment from high-throughput data streams. Moreover, fuel consumption value varies widely from one moment to another depending upon the speed, engine load, and other factors. The current approach constructs a functional structure of the following form:

Fuel-consumed (t1, t2)=f(Mass air flow, air-fuel ratio, engine-load, engine-rpm, vehicle speed, oxygen sensor, other operating condition parameters, t1, t2)

where t1 is the start-time, t2 is the end-time, and f represents a function of the argument attributes. The current approach works as follows:

STEP 1: Compute Orthogonal transformations of the input parameters of the function. For example, Fourier or Wavelet transformations or other orthogonal or approximately orthogonal transformations can be used.

STEP 2: Throw away the zero or near-zero coefficients in the orthogonal basis representation since their contribution to the value to be computed is negligible.

STEP 3: Perform the function computation using the non-zero coefficients in the orthogonal basis representation. Various efficient tree-based monitoring techniques are also used to detect changes in the coefficients in the orthogonal representation. This allows fast efficient computation of the fuel-consumption function in a resource-constrained onboard computing environment from high throughput data streams.

3.16 Onboard Fuel Tank Event Detection Analytics

MineFleet Onboard monitors the fuel tank level data and applies several times series analysis algorithms to filter out the noise for detecting changes in the fuel tank level. The main steps of this process are given below:
1) Observe Fuel Tank Data: MineFleet Onboard communicates with the vehicle and gets the fuel tank level data. This data is often noisy and fluctuates.
2) Apply Filtering Techniques to Remove Noise from the Observed Data: The onboard module applies various signal processing techniques to filter the noise out. It also makes use of how fluid level fluctuates in a moving vehicle in order to remove the noise from the fuel tank level data.

3.17. Onboard Driver Behavior Pattern Detection for Evaluating Quality of Driving and Insurance Applications MineFleet Onboard applies various algorithms described in Sections 3.6 through 3.12 for characterizing driver behavior patterns, segmenting the observed data, and evaluating the quality of the driving. This module computes patterns based on multi-variate data defined by vehicle and driving parameters such as speed, acceleration, braking, idling, turns, emissions characteristics and fuel consumption characteristics. These patterns are used to compute a score that evaluates the driver performance. This score is in turn used for various applications including but not limited to driver risk management, insurance premium computation and driver retraining Specific methodologies for extracting the driver behavior patterns are discussed below:

Onboard Analysis of Accelerometer Data

The accelerometer sensor can be installed in a vehicle at an angle to the frame of reference defined by the forward (F), vertical (V), and lateral (L) axes. For example, the accelerometer may be inside a device which connects to a vehicles' diagnostic port. The diagnostic ports in vehicles are installed in a wide variety of orientations, depending upon its make, model, and year. The 3-axis accelerometer sensor will measure the accelerations in its own frame of reference along the X, Y, and Z directions respectively. To accurately measure the forward, vertical, and lateral accelerations, we must get an accurate estimate of the angles at which the sensor is installed.

In particular, if we determine the plane defined by F and V axes in vehicle's frame of reference, by any two non-collinear vectors $(x_1, y_1, z_1)$ and $(x_2, y_2, z_2)$ from the F-V plane, in terms of accelerometer's frame of reference, we can determine the vector representing the lateral 'left' direction L by applying the left hand rule:

$$L = F \times V = \begin{vmatrix} y_1 & z_1 \\ y_2 & z_2 \end{vmatrix} x + \begin{vmatrix} x_1 & z_1 \\ x_2 & z_2 \end{vmatrix} y + \begin{vmatrix} x_1 & y_1 \\ x_2 & y_2 \end{vmatrix} z$$

Thus the problem of determining the vehicle's frame of reference in terms of the accelerometer's frame of reference reduces to the problem of determining the plane where the F and V axes lie. We apply the soft-margin support vector and multivariate regression techniques from machine learning on board the vehicle to get accurate estimates of the F-V plane. The following sections describe those.

Multiple Linear Regression

We use the multiple linear regression technique to estimate the F-V plane. Let w be the parameters of the F-V plane, where, $w_0+w_1x+w_2y+w_3z=0$. Let $a_1, a_2, \ldots, a_n$ be the observed samples. We must find the plane which minimizes the sum of squared errors, where error, $\epsilon$, is defined as the distance of the sample from the F-V plane. The squared error for a point a is given by $\epsilon^2=(w_1a_x+w_2a_y+w_3a_z)^2/(w_1^2+w_2^2+w_3^2)$. We apply quadratic optimization techniques to minimize the mean square error.

Zero and Orientation Calibration Procedure

The accelerometer at rest should experience acceleration only due the force of gravity. Each accelerometer device usually suffers from additive noise. The proposed approach applies various signal processing techniques for estimating those. We call this process the zero calibration step.

Rest of this section describes an iterative procedure to obtain the zero calibration and orientation calibrations. Note that we do not make any assumptions about independence of errors in x, y, and z directions.
1) Apply zero estimation procedure powered by machine learning techniques to get an initial estimate of the errors in x, y, z directions.
2) Apply orientation estimation procedure to get an initial estimate of the errors in x, y, z directions.
3) Repeat until the estimates have not converged to the final estimate,
    a. Apply zero estimation procedure to get an updated estimate of the errors in x, y, z directions.
    b. Apply the orientation calibration procedure using the original estimates of the forward, vertical, and lateral axes to obtain updated estimate.

Onboard Sharp Turn Detection

This module detects sharp turns at high speed by analyzing the data from accelerometer, vehicle diagnostic ports, and GPS. It continuously observes the time series data from these sensors over a short time period and performs various types of mathematical transformations to detect the driving patterns. Following is an example of the kind of analysis performed on the data:
1. Orthogonal transformations (e.g. Fourier, Wavelet) are applied on the time series data and significant coefficients are used to represent the observed multi-variate driver behavior data. This is used as a signature of the driver behavior for the observed segment of data.
2. The observed driver behavior signature is compared with that of unsafe turn for the given operating condition. If the signature is similar then the algorithm tentatively marks the observed behavior as a sharp turn at high speed. Apart from signature-based analysis, the current approach also identifies anomalous driver behavior by comparing the signature of a certain observed segment with the typical driving style by the same driver.

Onboard High Speed Tailgating Detection

This module detects tailgating behavior at high speed by analyzing the data from accelerometer, vehicle diagnostic ports, and GPS. Tailgating behavior refers to the scenario where the driver follows another car closely from behind and periodically comes very close to the other car and then reduces the speed. The data analysis module continuously observes the time series data from these sensors over a short time period and performs various types of mathematical transformations to detect the driving patterns. Following is an example of the kind of analysis performed on the data:

1. Orthogonal transformations (e.g. Fourier, Wavelet) are applied on the time series data and significant coefficients are used to represent the observed multi-variate driver behavior data. This is used as a signature of the driver behavior for the observed segment of data.
2. The observed driver behavior signature is compared with that of unsafe tailgating behavior for the given operating condition. If the signature is similar then the algorithm tentatively marks the observed behavior as tailgating at high speed. Apart from signature-based analysis, the current approach also identifies anomalous driver behavior by comparing the signature of a certain observed segment with the typical driving style by the same driver.

Onboard Speed Limit Violation Detection

This module detects speed limit violation by analyzing the data from accelerometer, vehicle diagnostic ports, and GPS. It continuously observes the time series data from these sensors; it makes web-service calls to check the speed limit from the database available at the server whenever certain conditions are triggered (e.g. the vehicle speed is above a certain limit). The speed limit is checked against the observed vehicle speed. If there is a violation then the module generates an alert. The module computes the distribution of such violation and reports that information back to the server.

Onboard Risky Lane Change Detection

This module detects unsafe lane changing behavior at high speed by analyzing the data from accelerometer, vehicle diagnostic ports, and GPS. This behavior refers to the scenario where the driver changes the driving lanes in a road very frequently often at a high speed. The data analysis module continuously observes the time series data from these sensors over a short time period and performs various types of mathematical transformations to detect the driving patterns. Following is an example of the kind of analysis performed on the data:
1. Orthogonal transformations (e.g. Fourier, Wavelet) are applied on the time series data and significant coefficients are used to represent the observed multi-variate driver behavior data. This is used as a signature of the driver behavior for the observed segment of data.
2. The observed driver behavior signature is compared with that of unsafe frequent lane changing behavior for the given operating condition. If the signature is similar then the algorithm tentatively marks the observed behavior. Apart from signature-based analysis, the current approach also identifies anomalous driver behavior by comparing the signature of a certain observed segment with the typical driving style by the same driver.

Onboard Hours of Service Reporting

This module monitors the total driving time of a driver in a given shift. It keeps a record of total amount of a time the driver has been driving without a pre-specified period of break and reports violations of the mandated policy. The module also stores these records for a specified period, reports those to the remote server and offers access through onboard device-interface. The module is also capable of taking input from the driver necessary for maintaining driving logs and various related data items.

Onboard Driver Behavior Scoring

MineFleet Onboard performs various kinds of driver behavior analysis onboard the vehicle. The results of the analysis are used to score the driver behavior. The score is a function of the driver's violation of the prescribed policies, speed limits, various other factors such as weather and visibility. The computed score is reported to the remote server for further processing. The score can also be reported to any onboard device such as a cell-phone.

3.18. Onboard and Remote-Server-Based Adaptive Techniques for Advertising Products and Services MineFleet Onboard is equipped by adaptive algorithms that trigger advertisement of various products and services based on the patterns in the observed diagnostic data. For example, if the MineFleet Predictive Health Monitoring detects a data pattern that indicates potential problems with the Oxygen sensors then adaptive advertisement management module may suggest related services available in the neighborhood of the vehicles operating area or the maintenance provider's location or other relevant locations. The overall adaptive advertisement management process works as follows:
1. Index the type of the advertisements by analyzing the content of the advertisements.
2. Represent the vehicle performance profile by several characteristics features regarding the vehicle health, driver behavior, fuel consumption and emissions profile.
3. Compare the type of the advertisement with the vehicle performance profile and identify the matches.
4. Inform the vehicle owner or the advertiser or both the vehicle owner and the advertiser about the match. If needed, the vehicle owner is shown the advertisement.

3.19. Onboard and Remote-Server-Based Techniques for Playing Single and Multi-Party Games based on the Vehicle Performance Data The vehicle performance data can be used for designing single-user or multi-user cooperative and/or competitive games. The games will be based on the following general structure:
1. Define an objective function F: $X'' \rightarrow R$ for the game which maps a domain $X''$ defined by the vehicle performance parameters of a single or a set of vehicles (S) to the range R, a real valued number.
2. A player (in case of a single user game) or each player (in case of multiple user games) will take a set of actions that includes changing the vehicle performance parameters for one or more set of vehicles (S) in order to maximize its or their respective objective functions. The set of actions may also include sharing performance characteristics among different vehicles or increasing the size of the set of vehicles S.
3. Achieving a certain value of the objective function may result in some reward.

The invention claimed is:
1. A multi-agent distributed data mining system for monitoring the performance of vehicles System has the following components:
   a. Onboard Module for Data Stream Mining: This component monitors vehicle diagnostic data coming out of OBD/J1708/J1939 ports, GPS data, and accelerometer (also known as G-sensor data) and performs the following data stream mining tasks to generate onboard results (analytics):
      i. onboard data stream mining for detecting the effects of various engine parameters on fuel consumption;
      ii. onboard predictive classification of driving patterns and associative indexing of driver performance matrix;
      iii. resource-constrained anomaly detection for onboard predictive vehicle health monitoring;
      iv. onboard vehicle emission data analysis;
      v. automated adaptive algorithm generation and management;

b. web-based presentation of the results of onboard data analysis and user-interaction, this component allows presentation of the analytics to the user using a web-based interface;
c. onboard and remote-server-based techniques for advertising products and services that are triggered by patterns identified by the vehicle data analysis;
d. pattern-driven web-based and onboard vehicle-to-vehicle social networking and collective computation.

2. The system of claim 1, further comprising a module for vehicle health scoring and generating MineFleet Fault Codes onboard the vehicle based on the predictive models constructed from the vehicle operating condition and various diagnostic data, reporting those to the remote server, and presenting the information to the user using either stand-alone or web-based interface.

3. The system of claim 1, further comprising a module for construction of predictive emissions profile of a vehicle onboard the vehicle, reporting those to the remote server and web server via a wired or wireless connection for wireless emissions monitoring and smog test.

4. The system of claim 1, further comprising a module for wireless smog test and reporting through email or query processing interface to determine whether or not a vehicle meets a smog test requirement.

5. The system of claim 1, further comprising a module for fuel consumption analysis and modeling for different types of driving behavior and different vehicle operating conditions, reporting that to the server, and presenting an information to the user using either stand-alone or web-based interface.

6. The system of claim 1, further comprising a module for fuel consumption analysis and modeling the effect of driver behavior and vehicle system parameters on fuel consumption, reporting that to the server, and presenting the information to the user using either stand-alone or web-based interface.

7. The system of claim 1, further comprising a module for identifying top reasons for getting poor fuel economy by analyzing the vehicle maintenance data and presenting those to the users.

8. The system of claim 1, further comprising a method for onboard driving pattern detection from speeding, acceleration, braking, idling, turning characteristics and various vehicle operating parameters for evaluating, scoring, and indexing the driver behavior.

9. The system of claim 8, further comprising of the zero calibration and orientation calibration systems, onboard sharp turn detection, onboard rapid acceleration and braking detection, onboard tailgating detection and onboard risky lane change detection.

10. The system of claim 1, further comprising a module for social networking among vehicles for sharing vehicle-related information among a group of vehicles for generating collective statistics about a class of vehicles.

11. The system of claim 1, further comprising a module for social networking among vehicles for vehicle-related information among a group of vehicles and their owners for buying a one or more vehicles, selling one or more vehicles, discussing one or more types of vehicles, maintaining one or more vehicles and performing other vehicle operations-related tasks.

12. The system of claim 1, further comprising a module for Onboard and remote-server-based techniques for playing single and multi-party games based on the vehicle data.

13. The system of claim 1, further comprising a module for building predictive models linking vehicle diagnostic data with vehicle maintenance data for detecting frequent and infrequent maintenance events.

14. The system of claim 1, further comprising a module for identifying maintenance operations and the possible reasons behind those at the remote server.

15. The system of claim 1, further comprising a module for generating vehicle health reports onboard the vehicle for short drive tests, used for a quick check of the current vehicle health conditions for the vehicle, reporting that to the server, and presenting the information to the user using either stand-alone or web-based interface.

16. The reports generated by the module of claim 15 to be used for the purpose of buying and selling a vehicle.

17. The system of claim 1 further comprising a module for detecting fuel tank events onboard the vehicle, reporting that to the server, and presenting the information to the user using either stand-alone or web-based interface.

18. The system of claim 1, further comprising a system for onboard and remote server-based adaptive techniques for advertising products and services that are triggered by patterns identified by vehicle performance data analysis.

19. The system of claim 18 for determining if an advertisement is relevant to a target vehicle performance profile, the system comprising of identifying targeting information for the advertisement; analyzing the content of the target vehicle profile to identify a set of one or more topics for the target vehicle profile; comparing the targeting information to the set of one or more topics to determine if a match exists; and determining that the advertisement is relevant to the target vehicle profile if the match exists.

20. The system of claim 18, wherein the advertisement belongs to an advertiser, and wherein identifying targeting information comprises receiving a list of topics from the advertiser.

* * * * *